Dec. 10, 1957  H. A. BANDEMER  2,815,603
"QUICK-RELEASE" FISH HOOK
Filed Nov. 9, 1956
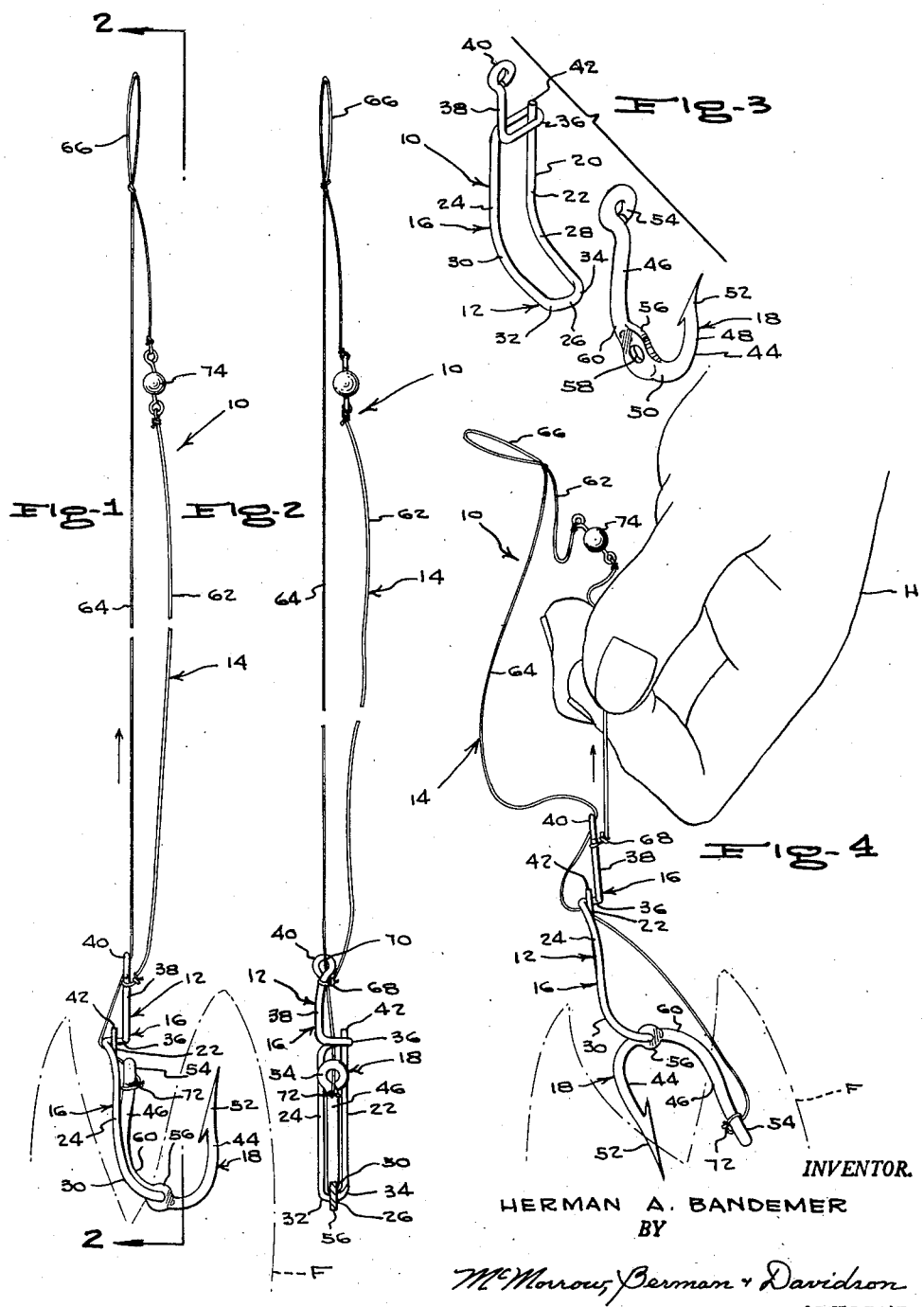
INVENTOR.
HERMAN A. BANDEMER
BY
McMorrow, Berman & Davidson
ATTORNEYS United States Patent Office 2,815,603
Patented Dec. 10, 1957

2,815,603

"QUICK-RELEASE" FISH HOOK

Herman A. Bandemer, Detroit, Mich.

Application November 9, 1956, Serial No. 621,283

15 Claims. (Cl. 43—43.16)

This invention relates generally to the angling art and is more particularly concerned with a "quick-release" fish hook, a primary object thereof being to provide a fish hook and fish hook assembly including means permitting said fish hook to be utilized in the manner in which conventional fish hooks are utilized and further including means facilitating the quick-release of a fish impaled on the barb of the quick-release fish hook.

A further object of invention in conformance with that set forth is to provide a novel quick-release fish hook incorporating a novel leader assembly facilitating the operation of said fish hook.

A more specific object of invention in conformance with that set forth is to provide in a quick-release fish hook of the character involved a support having a substantially U-shape intermediately pivoting a U-shaped hook thereon said support and hook incorporating line connecting means for connection to a leader assembly usable with said quick-release fish hook.

And yet a still further object of invention in conformance with that set forth is to provide a novel quick-release fish hook usable with a novel leader assembly, said leader assembly and fish hook being readily and economically manufactured, easily used, and highly satisfactory, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a side elevational view of the novel quick-release fish hook together with its cooperating leader assembly;

Figure 2 is a vertical section view taken substantially on line 2—2 of Figure 1;

Figure 3 is an exploded perspective view of the novel quick-release fish hook; and Figure 4 is a perspective view of the quick-release fish hook together with its cooperating leader assembly, showing the manner in which the parts function to permit a fish impaled on the barb of the hook to be readily removed therefrom.

Referring to the drawing in detail, a novel quick-release fish hook assembly is indicated generally at 10, said assembly comprising a fish hook indicated generally at 12 and a leader assembly indicated generally at 14. The hook 12 is constructed from any suitable material, a tempered steel being highly satisfactory for this purpose. The fish hook 12 comprises two cooperating parts including a support indicated generally at 16 and a hook indicated generally at 18.

The support 16 comprises a U-shaped member 20 including oppositely disposed substantially coplanar legs 22 and 24 terminating in a transverse bight or pivot shaft portion 26. The legs 22 and 24 include intermediate arcuate-bend portions 28 and 30, respectively, disposing the bight portion 26 out of the plane defined by the longitudinal axes of the legs 22 and 24. A leg 24 is connected to the bight portion 26 by means of a right-angle bend portion 32 thus deterring movement of the hook 18 on the leg 24 as will subsequently become apparent. The leg 22 is connected to the bight portion 26 by means of an arcuate-bend portion 34 facilitating the removal and replacement of the hook 18 on the leg 22 in the bight portion 26.

The leg 24 incorporates an intermediate laterally extending loop portion 36 having a substantially U-shape and extending normal to the longitudinal axis of the leg 24. The loop portion 36 continues in an upwardly extending portion 38 extending longitudinally of the leg 24 and terminating in a suitable eye portion 40. The leg 22 terminates in a free end portion 42, an intermediate portion thereof being removably and embraceably engaged in the loop portion 36 of leg 24 thus facilitating the removal and replacement of the hook 18 on the support.

The hook 18 comprises a substantially U-shaped member 44 incorporating spaced legs 46 and 48 and an intermediate transverse bight portion 50, the leg 48 terminates in a longitudinally extending barb portion 52. The leg 46, identified as the shank of the hook terminates at its upper end in a transversely disposed eye portion 54. The eye portion 54 is of sufficient width to abuttingly engage intermediate portions of the legs 22 and 24 as clearly seen in Figure 2, for example. The bight portion 50 incorporates an intermediate flattened portion 56 extending longitudinally relative to the longitudinal axes of legs 44 and 46, said flattened portion having extending transversely therethrough an aperture 58 to be pivotally received on the bight portion 26 of support 16 accordingly permitting the hook 18 to be disposed in the manner shown in Figure 4, for example, when the fish F is removed from the hook. The leg 46 of the hook incorporates an arcuate-bend portion 60 extending into the bight portion 50 of said hook, said arcuate-bend portion 60 substantially conforming to the arcuate-bend portions 28 and 30 of the legs 22 and 24, respectively, accordingly disposing said leg 46 is substantial planar alignment with the legs 22 and 24 when the fish hook is used in the manner clearly illustrated in Figure 1, this figure showing the fish F impaled on the barb portion 52 of the hook.

The leader assembly 14 comprises a pair of flexible lines 62 and 64 conveniently tied in an upper loop portion 66 for engagement with a fish line (not shown). A terminal end of the line 62 is suitably secured in circumposed relationship about portion 38 of leg 24 as indicated at 68. An intermediate portion of the line 64 extends through the eye 40 of leg 24 as indicated at 70 passing outside the loop portion 36 of leg 24, extending through the eye 54 of the hook 18 and is ultimately suitably secured about the shank or leg 46 of the hook as indicated at 72. Interposed in suitably secured relationship in an intermediate portion of the line 62 is a suitable abutment element 74 facilitating the grasping of line 62 and preventing the hand H of a person removing the fish F from the hook from slipping on said line 62.

Considering Figure 1, in normal use i. e. when fishing with the novel quick-release fish hook, the fish hook is utilized in the conventional manner and when a struggling fish is impaled on the barb portion 52 of hook 18, tension will be applied on the line 64 in the direction indicated by the direction arrow in Figure 1, wherein the eye portion 54 of hook 18 will be drawn into abutting engagement with intermediate portions of legs 22 and 24 of the support, as previously mentioned, and accordingly the fish may be readily landed. To remove the impaled fish, the line 62 is grasped in the manner clearly shown in Figure 4, sufficient slack being left in the line 64 to permit the hook 18 to rotate in the manner clearly shown in Figure 4 so as to permit the barb portion to be disposed in substantial longitudinal alignment with the legs of the support and by pulling on the line 62 in the manner indicated by the solid direction arrow, firmly grasping the fish F, the fish hook through the illustrated pivotal movement of hook 18 may be readily and expeditiously removed from the mouth of the fish.

The foregoing is considered to be illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook.

2. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, the connecting means on the shank of the hook comprising an integral eye portion transverse of said shank and abuttingly engageable with an intermediate portion of the legs of the support.

3. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg.

4. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg, said one leg terminating in a substantially right-angle bend portion at the bight portion of the support for detouring movement of said hook on the one leg, the other leg terminating at the bight portion in an arcuate-bend portion for facilitating removal and replacement of the hook on said other leg.

5. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on barb portion of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg, the connecting means on the shank of the hook comprising an integral eye portion transverse of said shank and abuttingly engageable with an intermediate portion of the legs of the support.

6. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg, said one leg terminating in a substantially right-angle bend portion at the bight portion of the support for detouring movement of said hook on the one leg, the other leg terminating at the bight portion in an arcuate-bend portion for facilitating removal and replacement of the hook on said other leg, the connecting means on the shank of the hook comprising an integral eye portion transverse of said shank and abuttingly engageable with an intermediate portion of the legs of the support.

7. A quick-release fish hook comprising a U-shaped support including oppositely disposed legs and a transverse bight portion, said support including an eye portion extending longitudinally from said legs, and a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, the legs of the support including an intermediate arcuate-bend portion disposing the bight portion of the support out of the plane defined by the longitudinal axes of the legs, the shank of the hook terminating in an arcuate-bend portion at the bight portion of said hook substantially conforming to the arcuate-bend portion of the legs of the support.

8. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook.

9. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, the line connected to the support including an intermediate integral abutment portion for facilitating the retention of said line in a person's hand when a fish is being removed from the hook.

10. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, the connecting means on the shank of the hook comprising an integral eye portion transverse of said shank and abuttingly engageable with an intermediate portion of the legs of the support.

11. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg.

12. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg, said one leg terminating in a substantially right-angle bend portion at the bight portion of the support for detouring movement of said hook on the one leg, the other leg terminating at the bight portion in an arcuate-bend portion for facilitating removal and replacement of the hook on said other leg.

13. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg, the connecting means on the shank of the hook comprising an integral eye portion transverse of said shank and abuttingly engageable with an intermediate portion of the legs of the support.

14. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, one leg of the support including an intermediate laterally extending loop portion normal to the longitudinal axis of said one leg and extending toward the other leg, said one leg terminating in the eye portion on said support, the other leg being resiliently supported on the bight portion of said support, an intermediate portion of said other leg being removably and embraceably engageable in the loop portion of said one leg, said one leg terminating in a substantially right-angle bend portion at the bight portion of the support for detouring movement of said hook on the one leg, the other leg terminating at the bight portion in an arcuate-bend portion for facilitating removal and replacement of the hook on said other leg, the connecting means on the shank of the hook comprising an integral eye portion transverse of said shank and abuttingly engageable with an intermediate portion of the legs of the support.

15. A quick-release fish hook assembly comprising a U-shaped support including oppositely disposed legs and a transverse bight portion, said support including an eye portion extending longitudinally from said legs, a U-shaped hook comprising spaced legs and a transverse bight portion, one leg of the hook comprising the shank of the hook and including line connecting means on the terminal end thereof, the other leg of said hook terminating in a barb portion, the bight portion of the hook being intermediately journaled on the bight portion of the support for disposing the shank thereof in substantial longitudinal alignment with the legs of the support when fishing and permitting the barb portion to be disposed in substantial longitudinal alignment with the legs of the support when removing a fish impaled on the barb portion of the hook, a leader assembly comprising a pair of flexible lines, means at the juncture of the lines for connection to a fish line, the terminal end of one line being secured to the upper end of the support, the other line extending through the eye portion of the support, the terminal end of said other line being secured to the line connecting means on the shank of the hook, the legs of the support including an intermediate arcuate-bend portion disposing the bight portion of the support out of the plane defined by the longitudinal axes of the legs, the shank of the hook terminating in an arcuate-bend portion at the bight portion of said hook substantially conforming to the arcuate-bend portion of the legs of the support.

No references cited.